(12) United States Patent
Akatsuka et al.

(10) Patent No.: US 7,366,143 B2
(45) Date of Patent: Apr. 29, 2008

(54) DIVERSITY RECEIVING RADIO BASE STATION WITH HIGH RECEPTION SENSITIVITY AND HIGH TIME SLOT UTILIZATION EFFICIENCY

(75) Inventors: Yasunori Akatsuka, Hashima (JP); Hiroyasu Yoshida, Kuwana-gun (JP); Daiki Takiguchi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 619 days.

(21) Appl. No.: 10/985,810

(22) Filed: Nov. 9, 2004

(65) Prior Publication Data

US 2005/0111479 A1 May 26, 2005

(30) Foreign Application Priority Data

Nov. 12, 2003 (JP) ............... 2003-383016

(51) Int. Cl.
*H04J 3/00* (2006.01)
*H04J 3/16* (2006.01)
*H04B 7/212* (2006.01)
*H04B 1/02* (2006.01)
*H04B 17/02* (2006.01)
*H04L 12/43* (2006.01)

(52) U.S. Cl. ............ 370/336; 370/442; 370/458; 370/468; 455/103; 455/135

(58) Field of Classification Search .......... None
See application file for complete search history.

(56) References Cited

U.S. PATENT DOCUMENTS

| | | | | |
|---|---|---|---|---|
| 4,530,087 A | * | 7/1985 | Yamamoto | ........ 370/350 |
| 5,203,023 A | * | 4/1993 | Saito et al. | ........ 455/133 |
| 5,430,731 A | * | 7/1995 | Umemoto et al. | ........ 370/337 |
| 5,446,922 A | * | 8/1995 | Siwiak et al. | ........ 455/277.2 |
| 6,085,076 A | * | 7/2000 | Lindsay et al. | ........ 455/277.1 |
| 6,678,508 B1 | * | 1/2004 | Koilpillai et al. | ........ 455/137 |
| 6,847,628 B1 | * | 1/2005 | Sakuma | ........ 370/347 |
| 2003/0169760 A1 | | 9/2003 | Sato et al. | |
| 2005/0208897 A1 | * | 9/2005 | Lyons et al. | ........ 455/67.11 |

FOREIGN PATENT DOCUMENTS

| | | |
|---|---|---|
| JP | 05-029992 | 5/1993 |
| JP | 2003-258717 | 9/2003 |

* cited by examiner

*Primary Examiner*—Huy D. Vu
*Assistant Examiner*—Nittaya Juntima

(57) ABSTRACT

The present invention aims to provide a radio base station that has equivalently high reception sensitivity without increasing the number of antenna elements while keeping the utilization efficiency of time slots high. The radio base station comprises a radio unit 101 and a radio unit 102. Two time slots, one at each radio unit, are allocated to a mobile station. After a signal transmitted from the mobile station is received and demodulated, a piece of data received by the radio unit 101 is compared with a piece of data received by the radio unit 102 so that one of the pieces of data that has fewer errors is selected.

10 Claims, 11 Drawing Sheets

FIG.2

200 SLOT ALLOCATION TABLE

| TERMINAL ID | RECEPTION LEVEL | FRAME A | FRAME B |
|---|---|---|---|
| PS1 | 80 | 1 | 1 |
| PS2 | 65 | 2 | 2 |
| PS3 | 55 | 3 | 3 |
| PS4 | 30 | 4 | 4 |
|  |  |  |  |
|  |  |  |  |
|  |  |  |  |
|  |  |  |  |

FIG.4

400 SLOT ALLOCATION TABLE

| TERMINAL ID | RECEPTION LEVEL | FRAME A | FRAME B |
|---|---|---|---|
| PS1 | 80 | 1 | |
| PS2 | 65 | | 1 |
| PS3 | 55 | 3 | 3 |
| PS4 | 30 | 4 | 4 |
| PS5 | 15 | 2 | 2 |
| | | | |
| | | | |
| | | | |

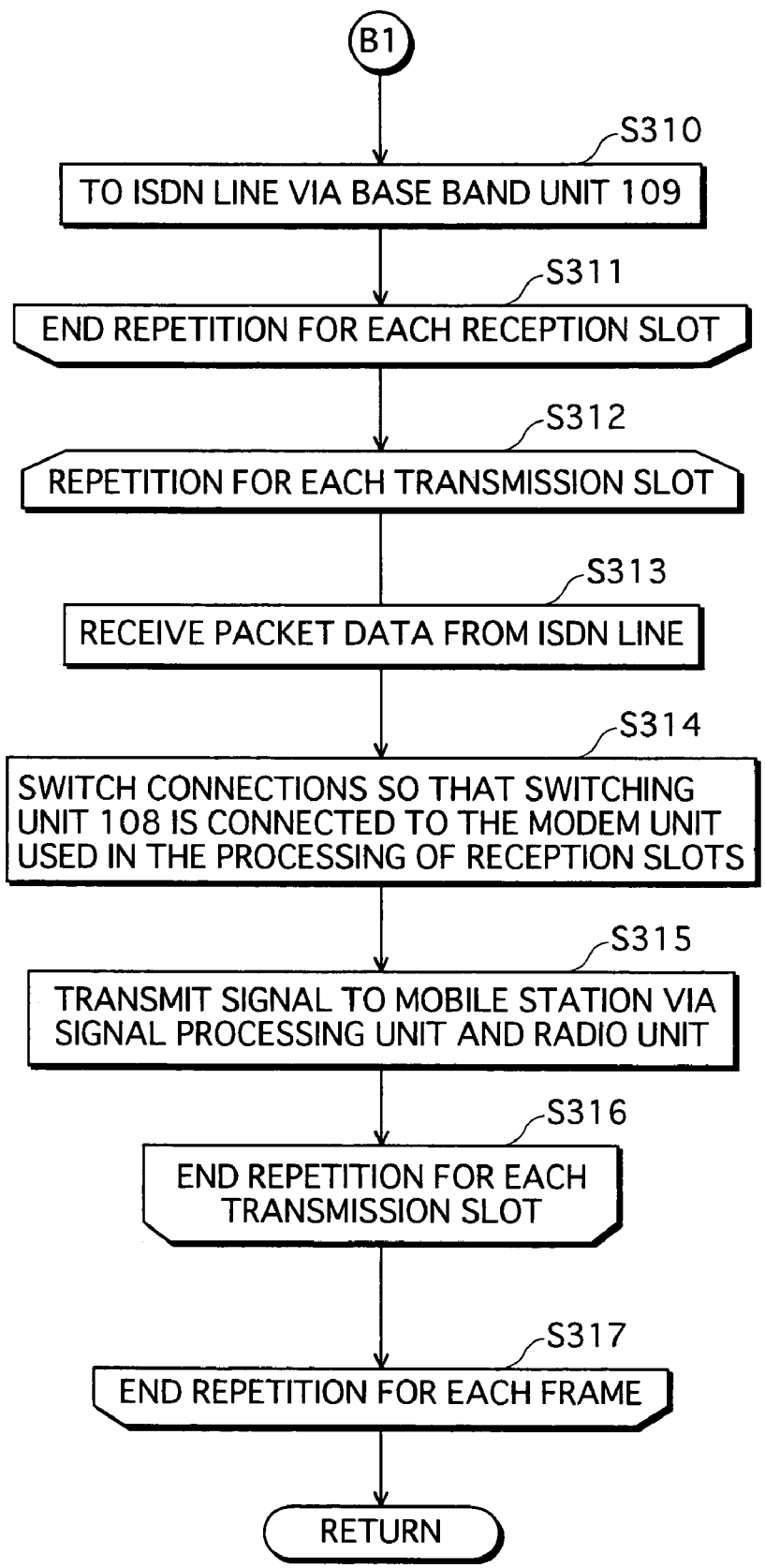

DIVERSITY RECEIVING RADIO BASE STATION WITH HIGH RECEPTION SENSITIVITY AND HIGH TIME SLOT UTILIZATION EFFICIENCY

This application is based on an application No. 2003-383016 filed in Japan, the content of which is hereby incorporated by reference.

BACKGROUND OF THE INVENTION

1. Field of the Invention

The present invention relates to a radio base station that communicates with mobile stations using radio waves.

2. Description of the Related Art

In a Personal Handy phone System (hereafter, it will be referred to as PHS), a radio base station that communicates with mobile stations using the TDMA/TDD (Time Division Multiple Access/Time Division Duplex) defined by the PHS standard. There is a demand for enlarging a cover area of each radio station from the aspects of efficient utilization of radio resources and reduction in facility costs.

In order to enlarge the cover area of a radio base station, it is necessary to raise the transmission power and to improve the reception sensitivity so that it is possible to communicate with mobile stations located more distantly. By making the output of a transmission power amplifier higher, it is possible to raise the transmission power of a radio base station. It is, however, necessary to increase the number of antenna elements in order to improve the reception sensitivity. Increasing the number of antenna elements will lead to a problem of having a larger-sized circuit and higher costs. As a solution that makes it possible to equivalently improve the reception sensitivity without increasing the number of antenna elements, the Patent Document 1 discloses a reception diversity method.

The Patent Document 1 discloses a radio base station that communicates with mobile stations using both a TDMA/TDD method and a SDMA (Space Division Multiple Access) method with an array antenna. According to the reception diversity method disclosed therein, in each frame, a link channel from a mobile station is allocated, instead of to a single slot, to a plurality of slots having different timings and different frequencies. The plurality of slots respectively receive signals of the same content, and a reception signal is generated by maximum-ratio combining all the received signals based on corresponding weight information. With this arrangement wherein the same information is received by the plurality of slots having different timings and frequencies, even if one of the slots experiences a reception error, there is a possibility that the same signal from the same mobile station can reach the base station in another slot. Thus, there is a higher possibility of receiving the signal eventually. Consequently, according to the diversity reception method described above, since the reception sensitivity of the radio base station is relatively higher, and it is easier to receive radio waves from a mobile station remotely located, it is possible to enlarge the cover area.

Patent Document 1:
the Japanese Unexamined Patent Application Publication No. 2002-290299.

SUMMARY OF THE INVENTION

Normally, slots in a TDMA/TDD frame can be allocated to at most four mobile stations. However, according to the reception diversity method disclosed in the Patent Document 1 above, slots in a frame cannot be allocated to four different mobile stations, and this leads to a problem that utilization efficiency of slots is low. The present invention is made in view of this problem, and an object of the present invention is to provide a radio base station that has equivalently higher reception sensitivity without increasing the number of antenna elements while keeping the utilization efficiency of time slots high.

In order to achieve the object, the present invention provides a radio base station that comprises a plurality of radio units and communicates with mobile stations, using a time division multiplexing, wherein a time slot at each of two or more of the plurality of radio units is allocated to a mobile station, the two or more radio units using mutually different channels, and the radio base station receives a signal transmitted from the mobile station via each of the two or more radio units and, after demodulating each of the received signals, selects one of the received signals that has fewest errors.

With this arrangement, a signal transmitted from one mobile station is received via two or more radio units. Consequently, in this case, the possibility of being able to receive a signal that has few errors is higher than in the case where the signal is received via only one radio unit. Further, since one of the received signals that has the fewest errors is selected after the received signals are demodulated, it is possible to transmit a signal having few errors to a telephone apparatus with which the radio base station communicates. Consequently, reception sensitivity is equivalently improved for a signal that tends to have some errors as being transmitted from, for example, a mobile station positioned near the edge of a cover area.

The present invention also provides a radio base station that includes two radio units and communicates with mobile stations, using a time division multiplexing, wherein a time slot at each of the two radio units that use mutually different channels is allocated to a mobile station, a signal transmitted from the mobile station is received via each of the two radio units, using the two allocated time slots; each of the two received signals are demodulated; and levels of errors in the two received signals are judged, and control is performed so that one of the two received signals that has fewer errors is selected.

With this arrangement, the radio base station having the two radio units allocates those two slots described above to one mobile station, in the case where each of the radio units has an open slot, and those time slots have the same timing in a TDMA/TDD frame used in the time division multiplexing. This way, the possibility of being able to receive a signal that has few errors is higher. Further, since one of the received signals that has fewer errors is selected after the received signals are demodulated, it is possible to transmit a signal having few errors to a telephone apparatus with which the radio base station communicates. Consequently, reception sensitivity is equivalently improved for a signal that tends to have some errors as being transmitted from, for example, a mobile station positioned near the edge of a cover area. Furthermore, it is possible to efficiently utilize open slots that are not used for communication.

It is acceptable that the radio base station has an arrangement wherein either (a) a reception level of a signal transmitted from a first mobile station currently communicating with the radio base station or (b) a reception level of a communication request transmitted from a second mobile station establishing a new communication is obtained, and according to the obtained reception level, it is judged whether a signal transmitted from a corresponding one of the first and second mobile stations should be received via two radio units or via one radio unit, and a time slot at each of two radio units that use mutually different channels is allocated to the corresponding one of the mobile stations, in a case where the judgment result indicates that the signal transmitted thereby should be received via two radio units.

With this arrangement, the radio base station judges whether two radio units are used or one radio unit is used, depending on the reception level of each of signals transmitted by a mobile station currently communicating with the radio base station and by a mobile station that has made a new communication request. Thus, the radio base station is able to selectively allocate two time slots to a mobile station that tends to have some errors, e.g. a mobile station positioned near the edge of a cover area of the radio base station so that the signals are received via two radio units. When signals are received via two radio units, the possibility of being able to receive a signal having few errors is higher.

Further, it is acceptable that the radio base station has an arrangement wherein a signal is transmitted to the corresponding one of the mobile stations with which the judgment result indicates that the signal transmitted thereby should be received via two radio units, using one of the allocated time slots and via one of the two radio units, control is performed so that the signal is transmitted to the corresponding one of the mobile stations via the one of the radio units that has received the signal judged to have fewer errors.

With this arrangement, since TDMA/TDD is a two-way communication method, in the case where a signal is received via each of two radio units, transmitting a downstream signal via the one of the radio units which has received the signal having fewer errors makes it possible to expect also the transmitted signal to have few errors. Accordingly, by selectively using radio units even at the time of transmission to the mobile stations, the quality of communication is improved for both reception and transmission. Thus, the feature is effective for communication with, for example, a mobile station located near the edge of a cover area.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 2 shows the data structure of the slot allocation table 200 stored in the control unit 107;

FIG. 4 shows the data structure of the slot allocation table 400 stored in the control unit 107;

FIG: 10 is a flow chart that shows the operation in the communication processing performed by the radio base station 100 and is continued to FIG. 11; and FIG. 11 is a flow chart that shows the operation in the communication processing performed by the radio base station 100 and is continued from FIG. 10.

DESCRIPTION OF THE PREFERRED EMBODIMENTS

As an embodiment of the present invention, the following describes the radio base station 100, with reference to the drawings. The radio base station 100 comprises two radio units. Each of the radio units performs four-channel multiplex communication by a time division multiplexing method defined by a PHS standard. The radio base station 100 is a PHS base station that, as a whole, is able to communicate with at most eight mobile stations.

Configuration

The following describes the configuration of the radio base station 100.

Figure 1:
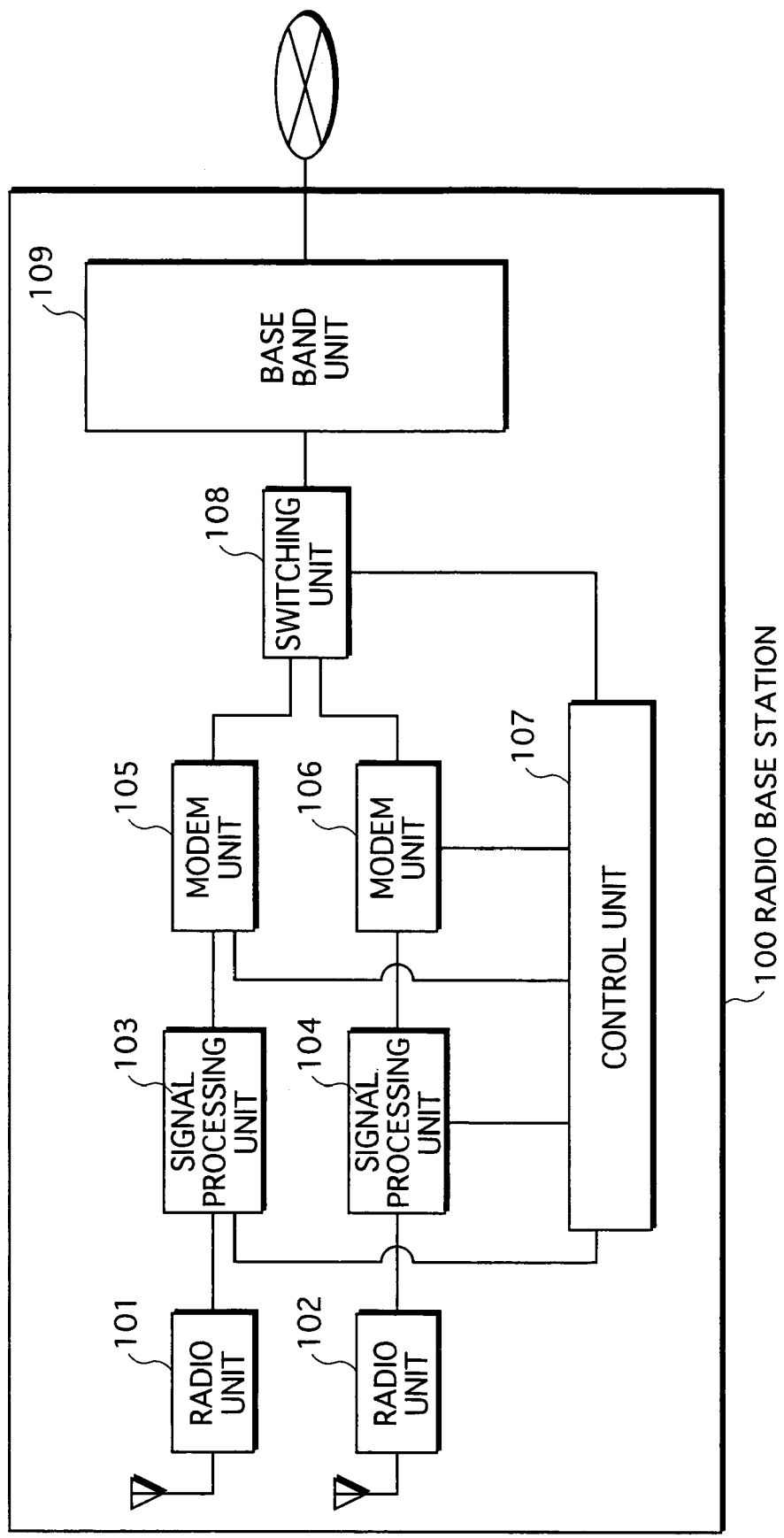
FIG. 1 is a block diagram that shows the configuration of the radio base station 100.

FIG. 1 is a block diagram that shows the configuration of the radio base station 100. As shown in the drawing, the radio base station 100 comprises a radio unit 101, a radio unit 102, a signal processing unit 103, a signal processing unit 104, a modem unit 105, a modem unit 106, a control unit 107, a switching unit 108, and a base band unit 109.

It should be noted that in the following description, "slot" and "time slot" are used in the same meaning.

(1) The Radio Unit 101 and the Radio Unit 102

The radio unit 101 includes: an antenna which is made up of four antenna elements; a receiving unit connected to the antenna; and a transmitting unit connected to the antenna. The radio unit 101 performs communication by time-divisionally multiplexing four channels within a TDMA/TDD frame, according to a PHS standard.

To be more specific, a TDMA/TDD frame is made up of four transmission slots (downstream slots) and four reception slots (upstream slots). A set of a transmission slot and a corresponding reception slot makes up one channel in the time division multiplexing. Thus, the radio unit 101 is able to have four channels constituted and to communicate with four mobile stations. In the following description, the TDMA/TDD frame which the radio unit 101 uses to communicate with a mobile station will be referred to as Frame A; the transmission slots in Frame A will be referred to as Ta1, Ta2, Ta3, and Ta4, in the temporal order; and the reception slots in Frame A will be referred to as Ra1, Ra2, Ra3 and Ra4, in the temporal order.

The radio unit 101 is connected to the signal processing unit 103. The reception unit converts a high-frequency signal received via the antenna to a low-frequency signal, amplifies the low-frequency signal, and outputs the amplified low-frequency signal to the signal processing unit 103. The transmitting unit converts a low-frequency signal inputted from the signal processing unit 103 to a high-frequency signal and transmits the high-frequency signal to a mobile station via the antenna.

The radio unit 102 has the same configuration as the radio unit 101 and performs communication by time-divisionally multiplexing four channels within a TDMA/TDD frame, according to a PHS standard. In the following description, the TDMA/TDD frame which the radio unit 102 uses to communicate with a mobile station will be referred to as Frame B; the transmission slots in Frame B will be referred to as Tb1, Tb2, Tb3, and Tb4 in the temporal order; and the reception slots in Frame B will be referred to as Rb1, Rb2, Rb3 and Rb4, in the temporal order. Detailed description of the radio unit 102 will be omitted.

(2) The Signal Processing Unit 103 and the Signal Processing Unit 104

In each of the time slots in Frame A, the signal processing unit 103 obtains, from the radio unit 101, a signal received from a mobile station. The signal processing unit 103 finds out a time at which a UW signal is received from the mobile station communicating in each time slot, using the beginning of each time slot as a point of reference. The signal processing unit 103 finds out the time in the following manner:

In a sequence of signals received in a time slot, a portion that contains a UW signal is defined by a PHS standard. The signal processing unit 103 stores therein the signal waveform of a UW signal. The signal processing unit 103 calculates, for each mobile station, a correlation value between (a) a signal waveform of the portion of the received signal that contains a UW signal, and (b) the signal waveform stored in advance in the signal processing unit 103. The correlation value calculated here is an index that shows the degree of matching between the two waveforms.

In addition to the calculated correlation value, the signal processing unit 103 sequentially takes each of different periods that are certain lengths of time before and after the portion containing the UW signal, the certain lengths corresponding to one or more symbols of communication period, and calculates a correlation value between a signal waveform received in each of those periods and the signal waveform stored in advance. The signal processing unit 103 judges, for each mobile station, that a period that has the highest correlation value among those periods is the period during which the UW signal is received (i.e. the reception timing).

The signal processing unit 103 considers the starting time of the period judged to be the UW signal reception period as the reception timing for the mobile station, the starting time being expressed by using the beginning of each time slot as a point of reference. It should be noted that the resolving power is determined by the number of over sampling for one waveform cycle. The signal processing unit 103 stores therein the reception timing found out as above. A PHS standard defines that the signal processing unit 103 transmits a signal to a mobile station when a predetermined period of time has elapsed after the detected reception timing of a signal received from the mobile station. Consequently, the signal processing unit 103 manages the transmission timing of signals to be transmitted according to the PHS standard.

The signal processing unit 103 detects, for each time slot, a terminal ID of the mobile station from which a signal is received and the reception level, and outputs the detected terminal ID and reception-level to the control unit 107. A terminal ID is a piece of identification information that is used by the radio base station 100 to identify a mobile station during the communication. The reception level is a level of a received signal which is transmitted from a mobile station at a predetermined level, and is used as an index to indicate the communication capability of each mobile station. The higher the reception level of a mobile station is, the higher the capability of the mobile station is in communication with the radio base station 100.

The signal processing unit 104 has the same configuration and functions as the signal processing unit 103. As shown in FIG. 1, the signal processing unit 104 is connected to the radio unit 102, and in the same manner as the signal processing unit 103, finds out the reception timing and outputs the reception timing to the control unit 107. The signal processing unit 104 obtains, from the radio unit 102, a signal received from each mobile station. For each of the mobile stations communicating in the respective time slots, by performing the same processing as the signal processing unit 103 does, the signal processing unit 104 finds out a reception timing at which a UW signal is received, stores the reception timing, and manages the transmission timing of a signal to be transmitted to the mobile station.

The signal processing unit 104 detects, for each time slot, the reception level of the mobile station and outputs the detected reception level to the controlling unit 107.

(3) The Modem Unit 105 and the Modem Unit 106

The modem unit 105 receives a base band signal that is π/4 shift QPSK (Quadrature Phase Shift Keying)-modulated from the signal processing unit 103, demodulates the modulated base band signal so as to generate a base band signal, and outputs the generated base band signal to the base band unit 109 via the switching unit 108. Also, the modem unit 105 receives a base band signal from the base band unit 109 via the switching unit 108, and π/4 shift QPSK-modulates the received base band signal, and then outputs the modulated base band signal to the signal processing unit 103.

The modem unit 106 has the same configuration and functions as the modem unit 105. As shown in FIG. 1, the modem unit 106 is connected to the signal processing unit 104, receives a modulated base band signal from the signal processing unit 104, demodulates the modulated base band signal so as to generate a base band signal, and outputs the generated base band signal to the base band unit 109 via the switching unit 108. The modem unit 106 receives a base band signal from the base band unit 109 via the switching unit 108, π/4 shift QPSK-modulates the received based band signal, and outputs the modulated base band signal to the signal processing unit 104. Description of the switching unit 108 will be provided later.

(4) The Control Unit 107

The control unit 107 includes a microprocessor, a ROM, and a RAM. The control unit 107 controls the operation of the radio base station 100 as a whole, through the microprocessor's execution of a computer program recorded on the ROM.

The Slot Allocation Table

The control unit 107 stores therein a slot allocation table and performs time slot allocating process using the slot allocation table. The slot allocation table has a terminal ID column, a reception level column, a Frame A column, and a Frame B column. While the radio base station 100 is communicating with no mobile stations, all of the terminal ID column, the reception level column, the Frame A column, and the Frame B column are blank in the slot allocation table. Every time the radio base station 100 communicates with a mobile station, a piece of data is written in each column.

Terminal IDs of mobile stations currently communicating with the radio base station 100 are written into the terminal ID column. Each of the terminal IDs is apiece of identification information for identifying a mobile station. In this example, "PS1", "PS2" and so on are used as the terminal IDs.

Reception levels of mobile stations each identified with a corresponding ID are written into the reception level column.

The slot name of a reception slot allocated to each mobile station, out of reception slots included in Frame A used in the communication performed by the radio unit 101, is written into the line corresponding to the mobile station, in the Frame A column. The slot name of a reception slot allocated to each mobile station, out of reception slots included in Frame B used in the communication performed by the radio unit 102, is written into the line corresponding to the mobile station, in the Frame B column.

In this example, each of the slot names is expressed with one of the values such as "1", "2", "3", and "4". The reception slots Ra1 and Rb1 are each referred to as "1". The reception slots Ra2 and Rb2 are each referred to as "2". The reception slots Ra3 and Rb3 are each referred to as "3". The reception slots Ra4 and Rb4 are each referred to as "4".

The Link Channel Establishment Processing

When having received a new link channel establishment request (a signal for requesting that a time slot should be allocated) from a mobile station via the radio unit 101 and the signal processing unit 103, or via the radio unit 102 and the signal processing unit 104, the control unit 107 performs link establishment processing in the following manner:

When having received, from either the signal processing unit 103 or 104, the reception level of a signal received from a mobile station and the terminal ID of the mobile station, the control unit 107 writes the terminal ID into the terminal ID column of the slot allocation table stored in the control unit 107. Subsequently, the control unit 107 writes the reception level into the reception level column. The control unit 107 then checks if the reception slots in Frame A and the reception slots in Frame B have already been allocated to other mobile stations.

When two reception slots having the same timing are open, that is to say, one open reception slot in Frame A has the same timing as the other open reception slot in Frame B, the control unit 107 allocates these two reception slots having the same timing to the mobile station that has transmitted the link channel establishment request. When a plurality of sets of two reception slots having the same timing are open, that is to say, each of some open reception slots in Frame A has the same timing as one of some reception slots in Frame B, the control unit 107 allocates one of the sets of two reception slots having the same timing to the mobile station.

The control unit 107 writes the slot name of the reception slot in Frame A allocated to the mobile station into the Frame A column of the slot allocation table and writes the slot name of the reception slot in Frame B allocated to the mobile station into the Frame B column of the slot allocation table.

The radio base station 100 receives a signal from the mobile station using the reception slot in Frame A allocated to the mobile station. Likewise, the radio base station 100 also receives the signal from the mobile station using the reception slot in Frame B allocated to the mobile station. In other words, the radio base station 100 receives the signal transmitted from the mobile station using the two radio units.

FIG. 2 shows the slot allocation table 200 after the radio base station 100, which initially had no link channels established with any mobile station, has allocated time slots in response to new link channel establishment requests made by four mobile stations (the terminals ID of which are PS1, PS2, PS3, and PS3, respectively) in the manner described above.

According to the slot allocation table 200, as for the mobile station whose terminal ID is PS1, the reception level of a signal transmitted from this mobile station to the radio base station 100 is "80", and the reception slot "Ra1" in Frame A and the reception slot "Rb1" in Frame B are allocated to this mobile station. As for the mobile station whose terminal ID is PS2, the reception level of a signal transmitted from this mobile station to the radio base station 100 is "65", and the reception slot "Ra2" in Frame A and the reception slot "Rb2" in Frame B are allocated to this mobile station. Description of the mobile station whose terminal ID is PS3 and the mobile station whose terminal ID is PS4 will be omitted, since it is similar.

Figure 3:
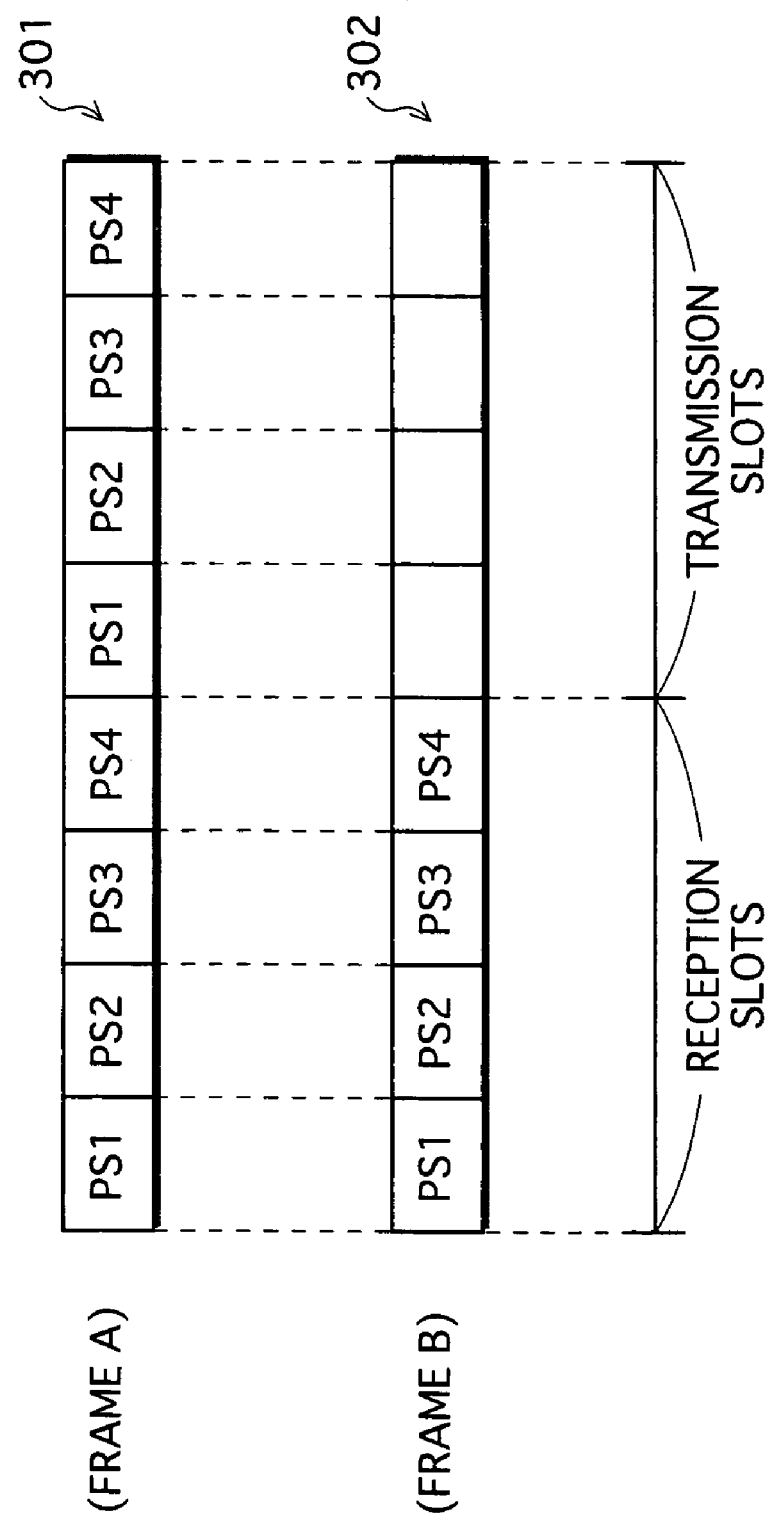
FIG. 3 is a conceptual drawing of TDMA/TDD frames which the radio base station 100 uses in communication, and this drawing corresponds to FIG. 2.

The state of each of the TDMA/TDD frames of the radio base station 100 is shown in FIG. 3. As shown in the drawing, the reception slots in Frame A 301 and in Frame B 302 are allocated to four mobile stations, i.e. PS1, PS2, PS3, and PS4, and are all used for communication. Thus, there are no open slots. As shown in the drawing, the radio base station 100 transmits signals to the PS1, PS2, PS3, and PS4 using the transmission slots in Frame A 301.

When having received a new link channel establishment request from another mobile station, while all of the reception slots in Frame A 301 and Frame B 302 are being used for communication, the radio base station 100 performs slot switching processing as described below so as to allocate a reception slot to the mobile station having made the new link channel establishment request.

The Slot Switching Processing

Having received a new link channel establishment request from another mobile station, the control unit 107 receives a terminal ID (it will be referred to as PS5) from either the signal processing unit 103 or the signal processing unit 104, as described earlier, and writes the received terminal ID into the terminal ID column of the slot allocation table 200. Subsequently, the control unit 107 receives the reception level of PS5 from either the signal processing unit 103 or the signal processing unit 104 and writes the received reception level into the reception level column of the slot allocation table 200.

The control unit 107 obtains, from the slot allocation table, the reception levels of the four mobile stations, i.e. PS1, PS2, PS3, and PS4, that are currently performing communication using the reception slots in Frame A and Frame B, as well as the reception level of the PS5 from which the new link channel establishment request is received. The control unit 107 selects two out of the five obtained reception levels that have the highest value(s) and switches the places of slots so that signals transmitted from the mobile stations having the two selected levels are received in the two reception slots having the same timing, one reception slot in Frame A and the other reception slot in Frame B.

More specifically, according to the terminal ID column and the reception level column of the slot allocation table 400 shown in FIG. 4, the reception levels of the mobile stations can be expressed as follows: PS1>PS2>PS3>PS4>PS5. Accordingly, the control unit 107 changes the allocation of the reception slot Rb1 in Frame B from PS1 to PS2, and changes the allocations of the reception slot Ra2 in Frame A and the reception slot Rb2 in Frame B from PS2 to PS5, so that each of the signals transmitted from the two mobile stations PS1 and PS2 having relatively higher reception levels is received by one radio unit respectively. The control unit 107 writes the slot names after the slot switching processing into the Frame A column and the Frame B column of the slot allocation table 400 so as to update the table.

Figure 5:
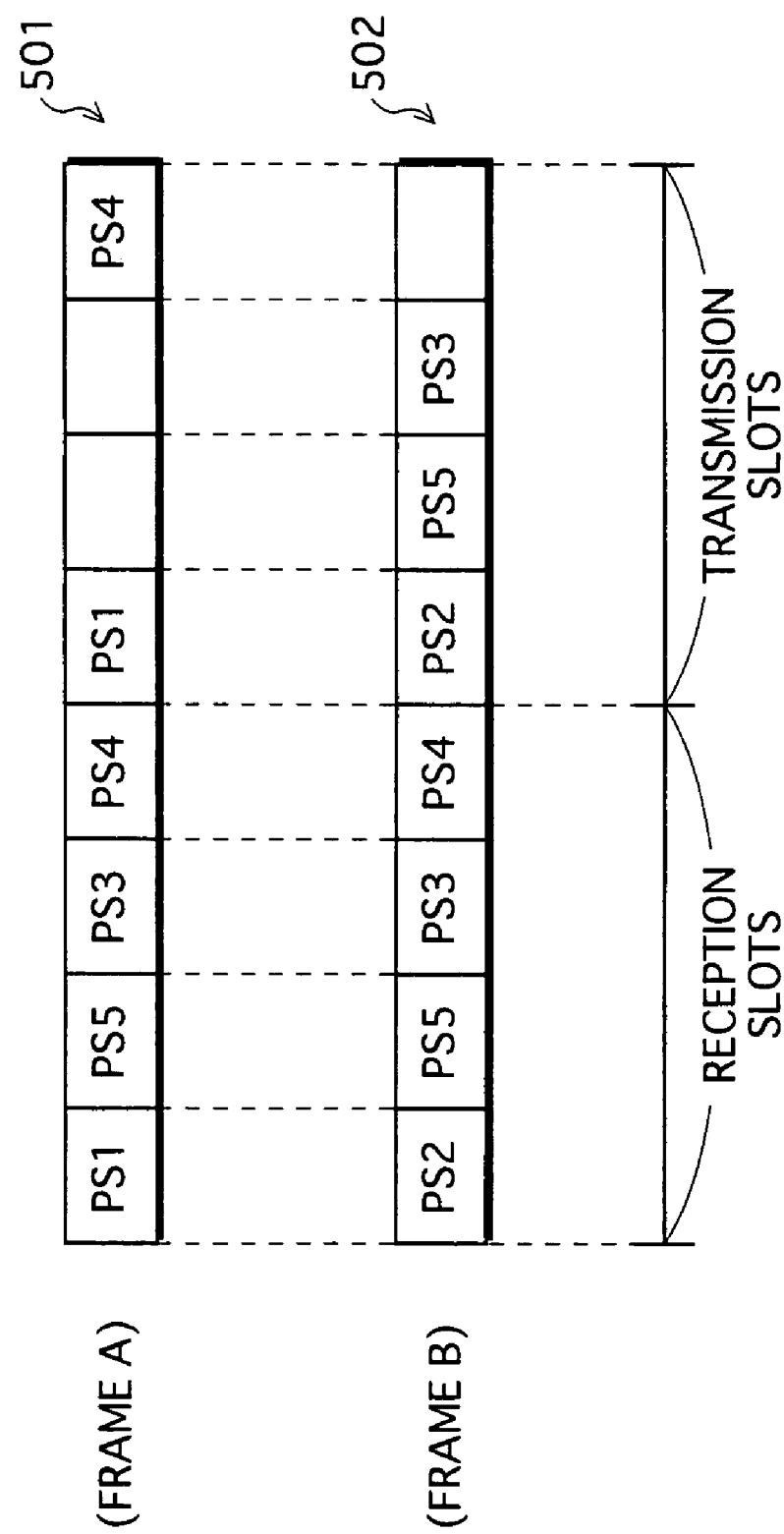
FIG. 5 is a conceptual drawing of TDMA/TDD frames which the radio base station 100 uses in communication, and this drawing corresponds to FIG. 4.

The state of each of the TDMA/TDD frames is shown in FIG. 5. As shown in the drawing, the radio base station 100 receives a signal from PS1 having the highest reception level via only the radio unit 101 and receives a signal from PS2 having the second highest reception level via only the radio unit 102. The radio base station 100 receives each of the signals transmitted from PS3, PS4, and PS5 having relatively lower reception levels than PS1 and PS2 via two radio units, i.e. the radio unit 101 and the radio unit 102, respectively. Further, as shown in the drawing, the radio base station 100 transmits a signal to each of PS1, PS3, and PS4 using transmission slots in Frame A 501, and transmits a signal to each of PS2 and PS5 using transmission slots in Frame B 502.

When having received a new link channel establishment request from yet another mobile station, the control unit 107 repeats the slot switching processing described above.

When all the time slots in Frame A and Frame B are used for communication (i.e. when the radio base station is communicating with eight mobile stations), even if the radio base station 100 receives a link channel establishment request from a new mobile station, the control unit 107 refuses to allocate a link channel to the new mobile station.

Error Checking and Switching Instructions

When the radio base station 100 has an arrangement in which a signal from a mobile station is received via two radio units, the control unit 107 controls the communication with the mobile station in the following manner:

At the time of reception (Upstream: PS--> the radio base station 100), the control unit 107 obtains (i) a signal inputted to the modem unit 105 via the radio unit 101 and the signal processing unit 103, and demodulated by the modem unit 105 and (ii) a signal inputted to the modem unit 106 via the radio unit 102 and the signal processing unit 104, and demodulated by the modem unit 106. The control unit 107 judges whether or not the demodulated signals obtained from the modem unit 105 and the modem unit 106 have errors. When the signal obtained from the modem unit 105 has some errors, the control unit 107 outputs a switching instruction to the switching unit 108 so that the modem unit 105 is disconnected from the base band unit 109, and the modem unit 106 is connected to the base band unit 109. When the signal obtained from the modem unit 106 has some errors, the control unit 107 outputs a switching instruction to the switching unit 108 so that the modem unit 106 is disconnected from the base band unit 109, and the modem unit 105 is connected to the base band unit 109.

At the time of transmission (Downstream: the radio base station 100-->PS), the control unit 107 outputs a switching instruction to the switching unit 108 so that the one of the modem unit 105 and the modem unit 106 that was used for the reception is connected to the base band unit 109.

On the other hand, when the radio base station 100 has an arrangement in which a signal from a mobile station is received via one radio unit, the control unit 107 outputs a switching instruction to the switching unit 108 so that both of the modem unit 105 and the modem unit 106 are connected to the base band unit 109, both at the time of reception and at the time of transmission.

Figure 6:
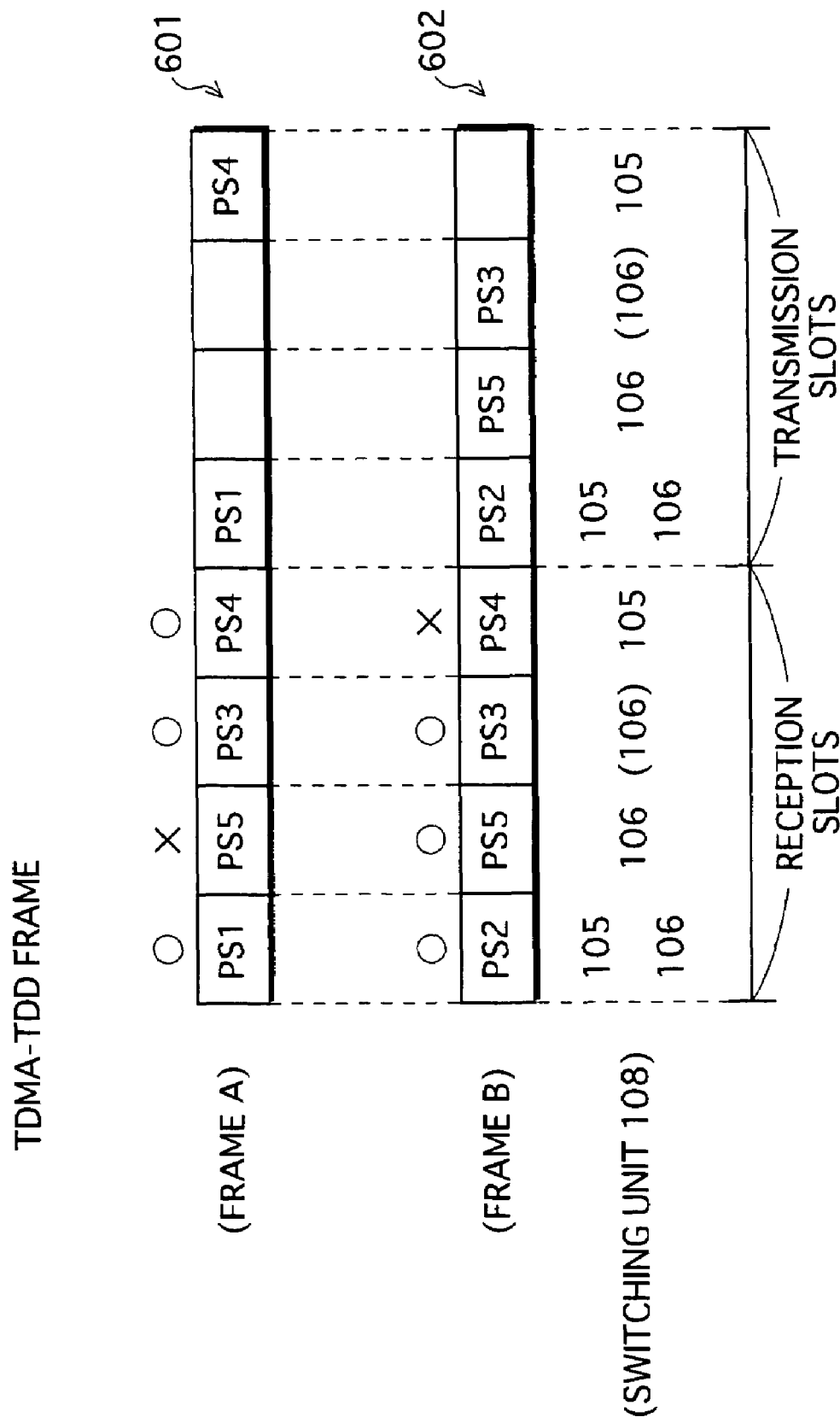
FIG. 6 illustrates error checking and communication processing performed by the control unit 107.

The following describes a specific example of error checking and switching instructions, with reference to FIG. 6.

In FIG. 6, the circles (○) marked above the reception slots in Frame A 601 denote that the signals received in these reception slots and demodulated by the modem unit 105 each have no error. The X (x) denotes that the signal received in the reception slot and demodulated by the modem unit 105 has some errors. Similarly, the circles (○) marked above the reception slots in Frame B 602 denote that the signals received in these reception slots and demodulated by the modem unit 106 each have no error. The X (x) denotes that the signal received in the reception slot and demodulated by the modem unit 106 has some errors. Each of the references "105", "106", and "105 and 106" written beneath Frame B 602 indicates a switching instruction that the control unit 107 outputs to the switching unit 108.

The signal received in the reception slot Ra1 is received from PS1. The signal received in the reception slot Rb1 is received from PS2. Since the radio unit 101 and the radio unit 102 use mutually different channels to receive signals in these reception slots, the control unit 107 outputs, as a switching instruction, "105 and 106" to the switching unit 108.

The signals received in the reception slot Ra2 and Rb2 are both received from PS5. Out of the signals obtained by having these received signals demodulated by the modem unit 105 and the modem unit 106 respectively, the signal demodulated by the modem unit 105 has some errors; therefore, the control unit 107 outputs, as a switching instruction, "106" to the switching unit 108.

The signals received in the reception slots Ra3 and Rb3 are both received from PS3, and neither of the signals obtained by having these received signals demodulated by the modem unit 105 and the modem unit 106 respectively have errors; therefore the control unit 107 outputs no switching instruction. Each of the references "(106)" written beneath the reception slots Ra3 and Rb3 indicates that the switching unit 108 is connected to the modem unit 106.

The signals received in the reception slots Ra4 and Rb4 are both received from PS4. Out of the signals obtained by having these received signals demodulated by the modem unit 105 and the modem unit 106 respectively, the signal demodulated by the modem unit 106 has some errors; therefore, the control unit 107 outputs, as a switching instruction, "105" to the switching unit 108.

With regard to the transmission slot Ta1 and the transmission slot Tb1, the control unit 107 outputs, as a switching instruction "105 and 106" to the switching unit 108, in the same manner as with regard to the reception slots Ra1 and Rb1.

With regard to the transmission slot Ta2 and the transmission slot Tb2, the control unit 107 outputs, as a switching instruction, "106" to the switching unit 108, in the same manner as with regard to the reception slots Ra2 and Rb2. At this time, since the modem unit 105 receives no base band signal from the base band unit 109, the transmission slot Ta2 in Frame A is not used for the communication with PS5.

With regard to the transmission slot Ta3 and the transmission slot Tb3, the control unit 107 outputs no switching instruction to the switching unit 108, in the same manner as with regard to the reception slots Ra3 and Rb3. At this time, the switching unit 108 is connected to the modem unit 106. Since the modem unit 105 receives no base band signal from the base band unit 109, the transmission slot Ta3 in Frame A is not used for the communication with PS3.

With regard to the transmission slot Ta4 and the transmission slot Tb4, the control unit 107 outputs, as a switching instruction, "105" to the switching unit 108, in the same manner as with regard to the reception slots Ra4 and Rb4. At this time, since the modem unit 106 receives no base band signal from the base band unit 109, the transmission slot Tb4 in Frame B is not used for the communication with PS4.

The control unit 107 repeatedly performs the above-described error checking and outputting of switching instructions to the switching unit 108 for each of the time slots, and further, for each of the TDMA/TDD frames.

(5) The Switching Unit 108

The switching unit 108 is a switch that is operable to switch the connections so as to have one of the following arrangements: (i) the base band unit 109 is connected to the modem unit 105, (ii) the base band unit 109 is connected to the modem unit 106, and (iii) the base band unit 109 is connected to both the modem unit 105 and the modem unit 106. As for the initial setting of the switching unit 108, the base, band unit 109 is connected to both the modem unit 105 and the modem unit 106.

According to each switching instruction from the control unit 107, the switching unit 108 switches the connections.

(6) The Base Band Unit 109

The base band unit 109 is connected to a switch box via an ISDN line.

The base band unit 109 receives packet data via the ISDN line, takes out traffic information from the received packet data, performs a TDMA modulation processing, and decomposes the traffic signals having been taken out into a plurality of base band signals so as to output the base band signals to the switching unit 108.

Here, the TDMA modulation processing is to time-divisionally multiplex four channels in one TDMA/TDD frame, according to a PHS standard.

Further, the base band unit 109 receives a plurality of base band signals from the modem unit 105 and/or the modem unit 106 via at most four channels within one TDMA/TDD frame, generates packet data from the received base band signals, and outputs the generated packet data via the ISDN line.

Operations

The following describes the operation performed by the radio base station 100, with reference to the flow charts shown in FIGS. 7 to 11.

(1) The Overall Operations

Figure 7:
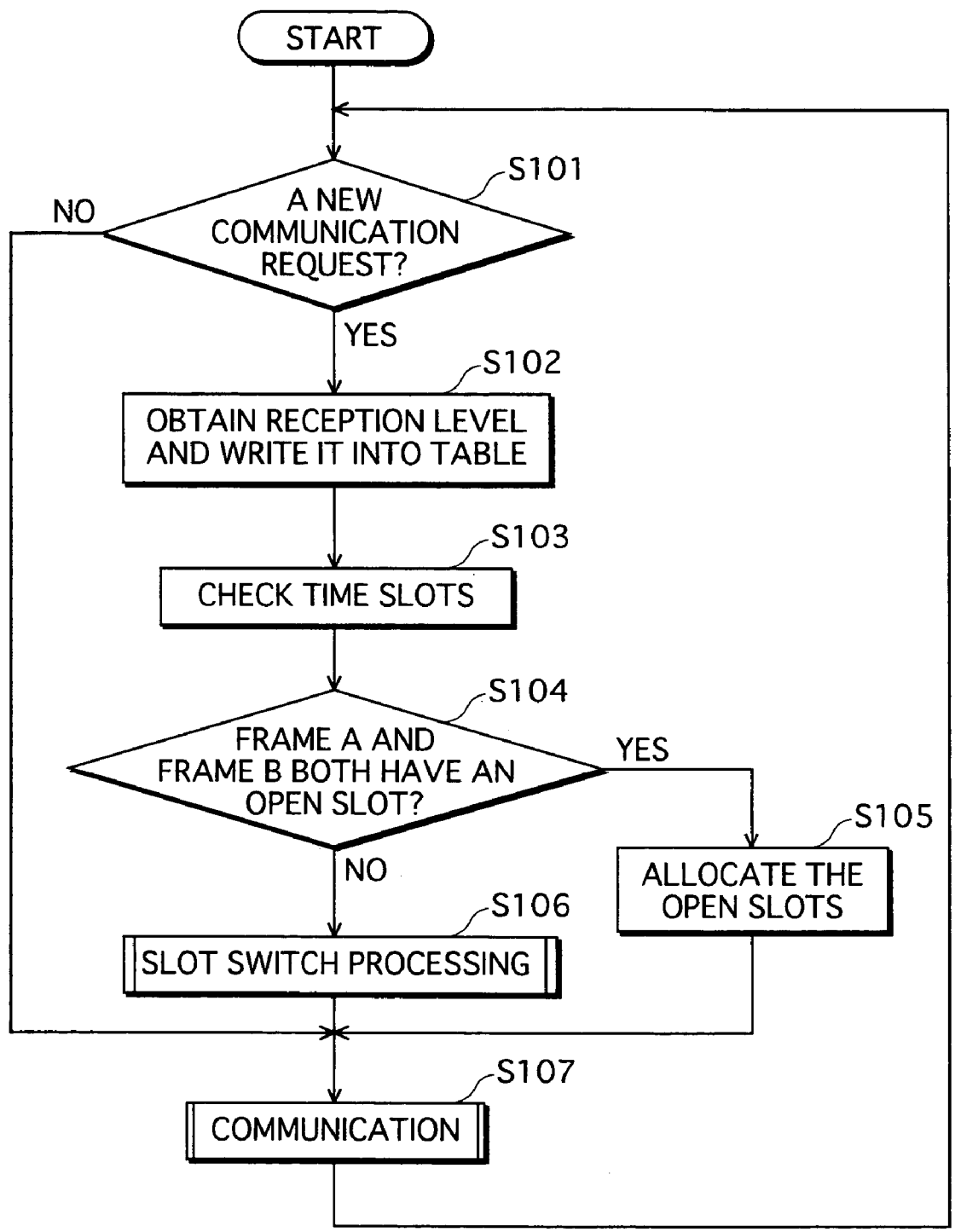
FIG. 7 is a flow chart that shows the operation of the radio base station 100 as a whole.

The flow chart shown in FIG. 7 shows the operation performed by the radio base station 100 as a whole. When the radio base station 100 receives no communication request from any new mobile station (Step S101: No), the procedure advances to Step S107, and the processing is continued. When having received a communication request from a new mobile station (Step S101: YES), the radio base station 100 obtains the terminal ID and the reception level contained in the communication request, and writes the obtained terminal ID and reception level to the slot allocation table stored in the control unit 107 (Step S102).

The control unit 107 checks the states of the time slots using the slot allocation table (Step S103). When there are two open reception slots having the same timing, one in Frame A and the other in Frame B (Step S104: YES), the control unit 107 allocates those two reception slots having the same timing in Frame A and Frame B to the mobile station that has made the new communication request (Step S105). When there are no reception slots having the same timing in Frame A and Frame B (Step S104: No), the control unit 107 performs the slot switching processing (Step S106). Subsequently, the control unit 107 performs the communication processing (Step S107), and the procedure returns to Step S101 so that the processing is continued.

(2) The Operation in the Slot Switching Processing

Figure 8:
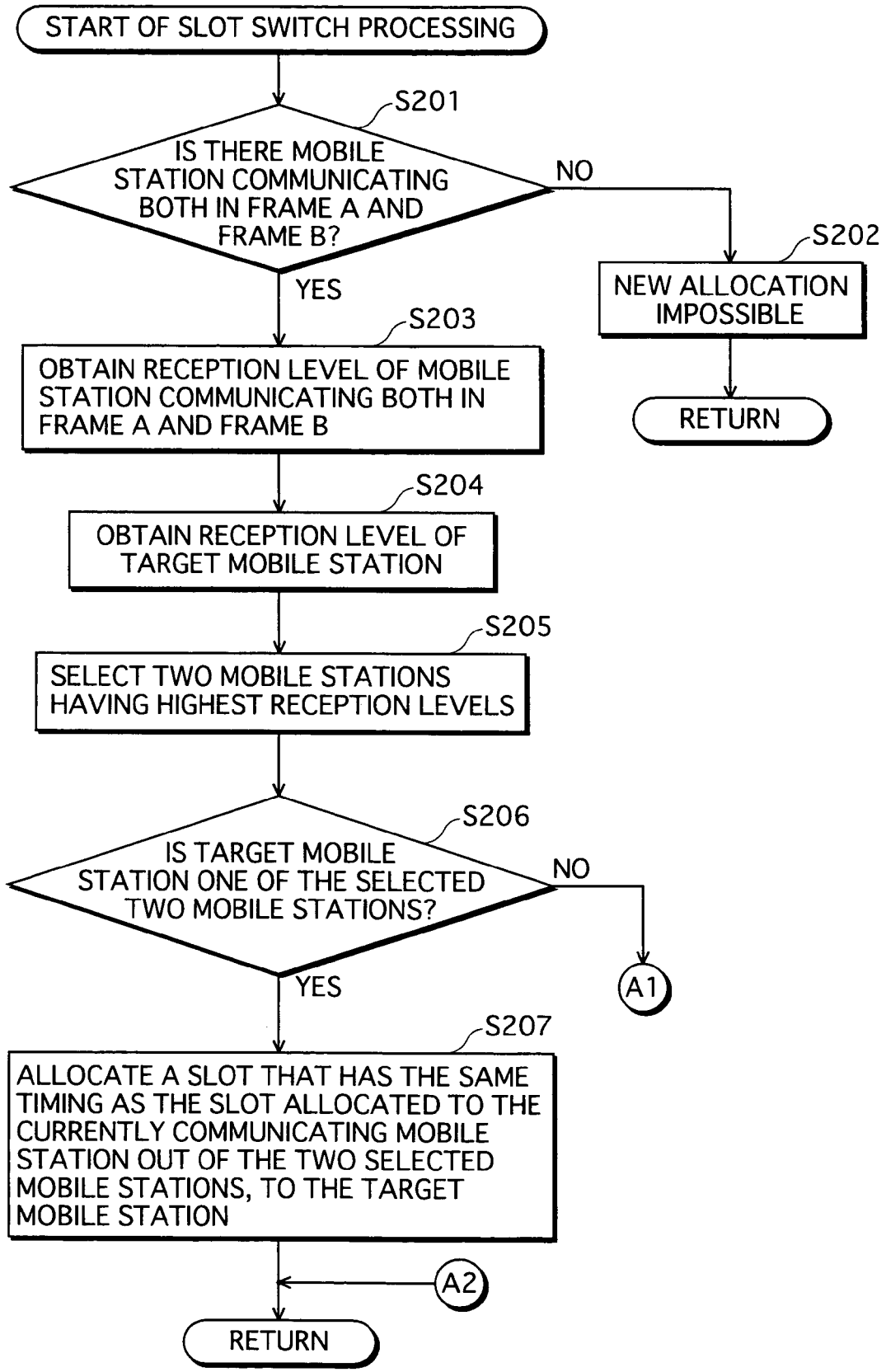
FIG. 8 is a flow chart that shows the operation in the slot switching processing performed by the control unit 107 and is continued to FIG. 9.
Figure 9:
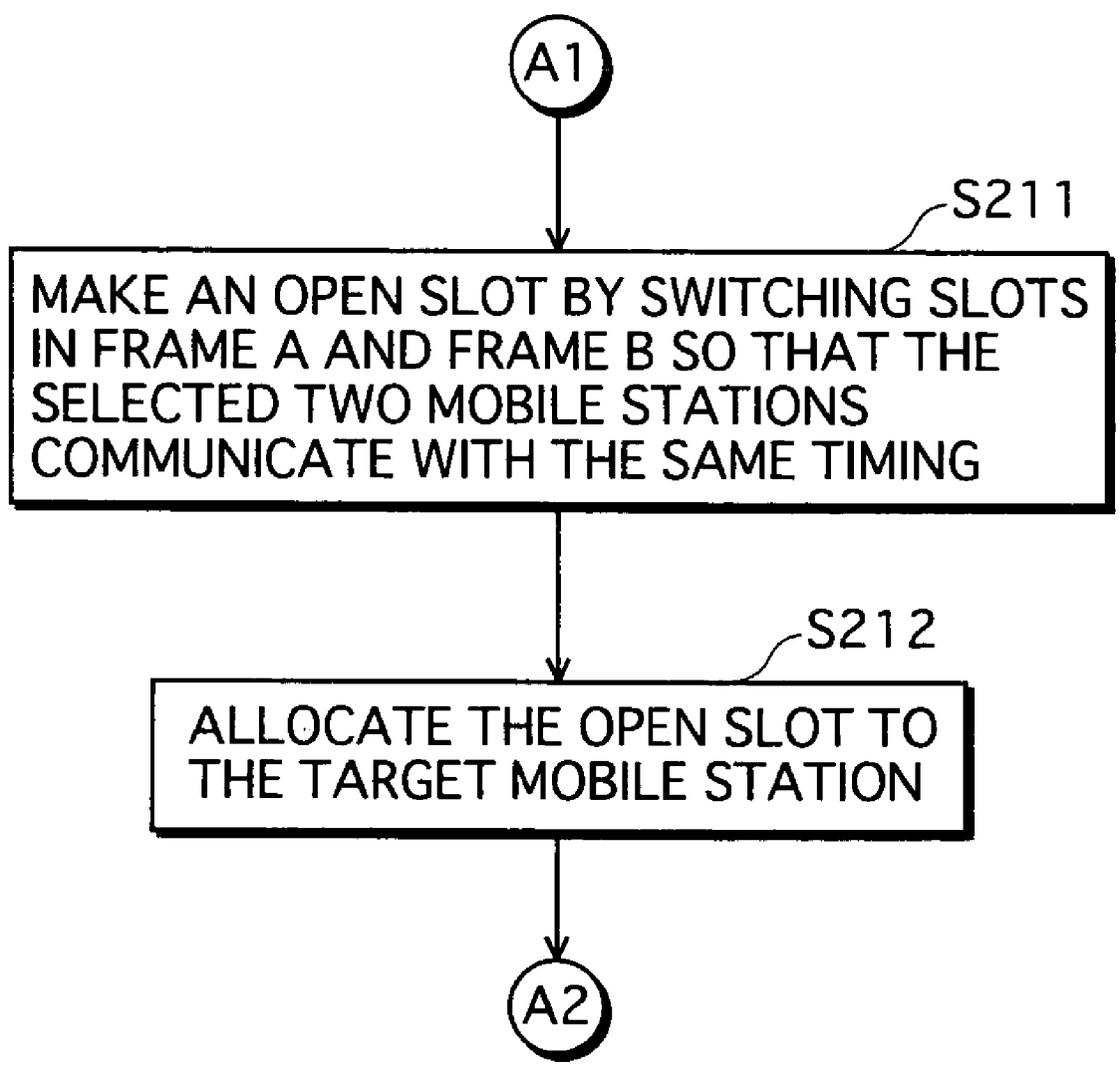
FIG. 9 is a flow chart that shows the operation in the slot switching processing performed by the control unit 107 and is continued from FIG. 8.

The flow chart shown in FIGS. 8 and 9 shows the operation of the slot switching processing performed by the control unit 107. It should be noted that the operation presented here is the detailed description of the operation performed in Step S106 in FIG. 7.

The control unit 107 judges whether or not there are reception slots used for receiving signals from one mobile station in both Frame A and Frame B. When there are no such reception slots used for receiving signals from one mobile station in both Frame A and Frame B (Step S201: NO), the radio base station 100 refuses to allocate a link channel to the new mobile station, because the radio base station 100 is currently communicating with eight mobile stations (Step S202). Subsequently, the procedure returns to Step S107, and the processing is continued.

When there are reception slots that are used for receiving signals from one mobile station in both Frame A and Frame B (Step S201: YES), since seven or less mobile stations are currently communicating with the radio base station 100, it is possible total locate a link channel to the new mobile station. Accordingly, the control unit 107 obtains, from the slot allocation table, the reception level of each of the signals which the radio base station 100 receives from such mobile stations that use two reception slots, one reception slot each in Frame A and Frame B (Step S203).

Further, the control unit 107 obtains the reception level of the new mobile station that has been written into the slot allocation table in Step S102 (Step S204). The control unit 107 selects two mobile stations that have the highest reception level(s) among the reception levels obtained in Steps S203 and S204 (Step S205).

Subsequently, the control unit 107 judges whether or not the new mobile station is one of the two mobile stations selected in Step S205. When the new mobile station is one of the two selected mobile stations (Step S206: YES), the control unit 107 allocates, to the new mobile station, one of the slots in Frame A and Frame B allocated to the mobile station that is one of the two selected mobile stations and is not the new mobile station (Step S207). In other words, the radio base station 100 communicates with one of the two mobile stations that have the highest reception level(s), using two slots having the same timing, one in Frame A and the other in Frame B.

When the new mobile station is not one of the two mobile stations selected in Step S205 (Step S206: NO), the control unit 107 allocates one of the two slots, each in Frame A and Frame B, that are allocated to one (e.g. Mobile Station a) of the two selected mobile stations (e.g. Mobile Station a and Mobile Station b) to the other mobile station (e.g. Mobile Station b), and makes both the slot in Frame A and the slot in Frame B that have been allocated to Mobile Station b open (Step S211) The control unit 107 then allocates those two open slots, one each in Frame A and Frame B, that are made available in Step S211 to the new mobile station (Step S212).

(2) The Operation in the Communication Processing

Figure 10:
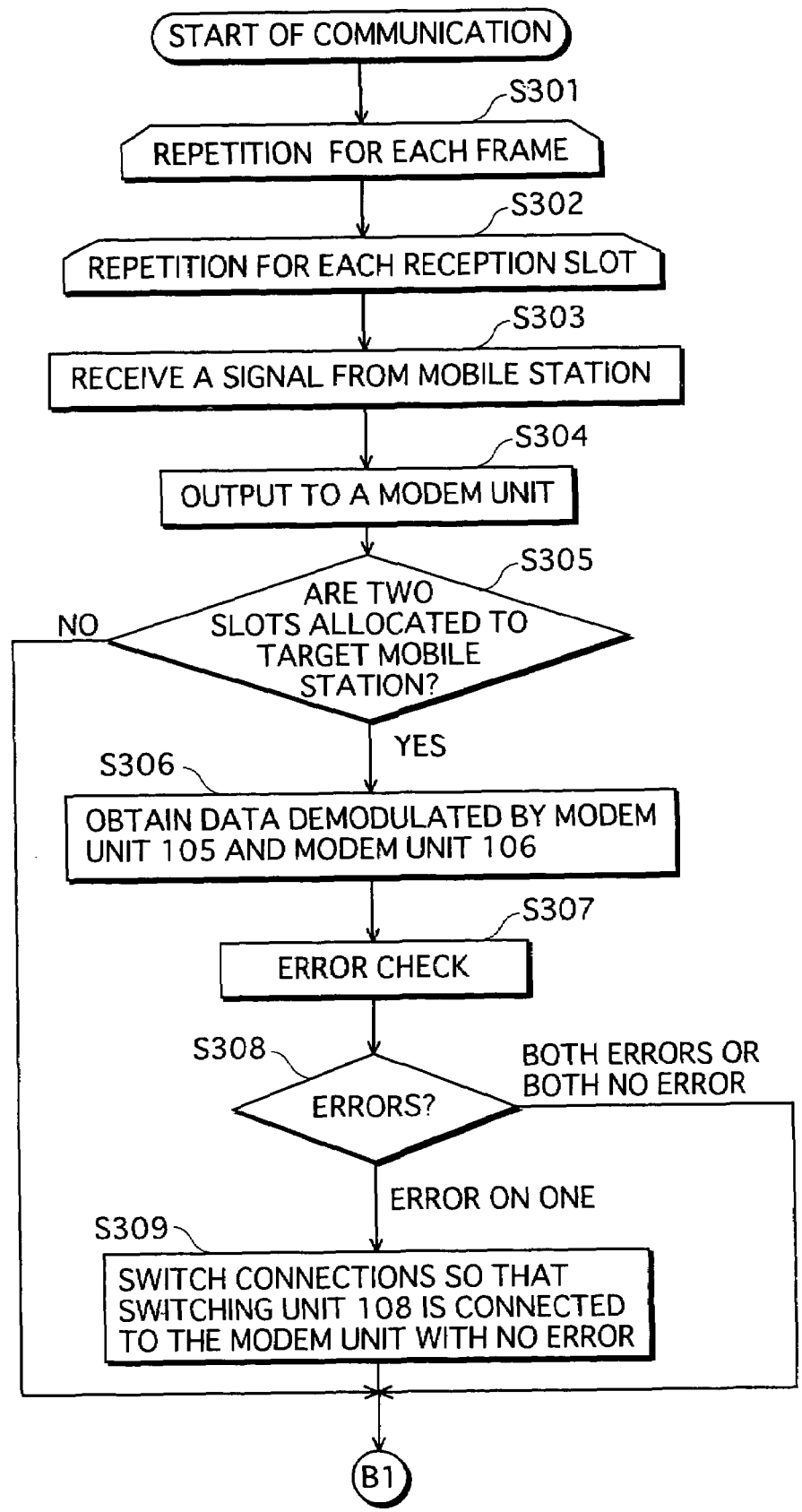

The flowchart shown in FIGS. 10 and 11 shows the operation of the communication processing performed by the radio base station 100. It should be noted that the operation presented here is the detailed description of the operation performed in Step S107 in FIG. 7.

The radio base station 100 repeatedly performs the operation in steps from Step S301 through Step S317 for each of the TDMA/TDD frames. The radio base station 100 repeatedly performs the operation in steps from Step S302 through Step S311 for each of the reception slots.

The radio base station 100 receives a signal from a mobile station via the radio unit 101 or the radio unit 102 (Step S303). When having received a signal via the radio unit 101, the radio base station 100 outputs the signal to the modem unit 105 via the signal processing unit 103. When having received a signal via the radio unit 102, the radio unit outputs the signal to the modem unit 106 via the signal processing unit 104 (Step S304).

When two reception slots, one reception slot at the radio unit 101 and the other reception slot at the radio unit 102, are allocated to the mobile station (Step S305: YES), the control unit 107 obtains pieces of data demodulated by the modem unit 105 and the modem unit 106 (Step S306). The control unit 107 performs the error checking to check if each of the pieces of data obtained from the modem unit 105 and the modem unit 106 has some errors (Step S307).

As a result of the error checking, when one of the pieces of data obtained from the modem unit 105 and the modem unit 106 has some errors (Step S308: ERROR ON ONE), the control unit 107 outputs a switching instruction to the switching unit 108 so that the modem unit having no error is connected to the base band unit 109. The switching unit 108 switches the connections according to the switching instruction (Step S309). Subsequently, the radio base station 100 outputs packet data from the modem unit 105 and/or the modem unit 106 to the ISDN line via the switching unit 108 and the base band unit 109 (Step S310).

Subsequently, the radio base station 100 repeatedly performs the operation in steps from S312 through S316 for each of the transmission slots. The base band unit 109 receives the packet data from the ISDN line (Step S313). The control unit 107 outputs a switching instruction to the switching unit 108 so that the modem unit used for demodulating the signal received in the corresponding reception slot is connected to the base band unit 109. The switching unit 108 switches the connections according to the switching instruction from the control unit 107 (Step S314). A signal is transmitted from the base band unit 109 to the mobile station via the modem unit, a signal processing unit, and a radio unit (Step S315).

SUMMARY

As explained above, the radio base station 100 of the present invention is a PHS base station and comprises the radio unit 101 and the radio unit 102 that receive signals using time slots that are in mutually different channels. After the signals are demodulated, when the data received by the radio unit 101 has some errors and the data of the same content received by the radio unit 102 has no error, the radio base station 100 selects the demodulated data with no error that is received by the radio unit 102.

By performing the above-described operation in each of the slots in the time-division multiplexing, the radio base station 100 is able to recover from errors in an error slot and is thereby able to equivalently improve the reception capability thereof. In particular, this feature is effective in communication with a mobile station that requires high reception sensitivity, such as a mobile station that is located near the edge of a cover area.

Other Modification Examples (1) In the embodiment described above, the radio base station 100 comprises two radio unit, two signal processing units, a control unit, a switching unit, and a base band unit; however, the present invention also includes a radio base station that comprises two radio devices, each of which includes a radio unit, a signal processing unit, a control unit, and a base band unit. To be more specific, in such a case, an arrangement is made wherein the two independent radio devices each receive a signal from a mobile station, and after those received signals are demodulated, the radio base station checks if there are errors so that only one of the received signals that has no error is outputted.

(2) In the slot switching processing, it is acceptable to have an arrangement wherein a threshold value for the reception level is set, and when the reception level of a signal transmitted from a mobile station is equal to or lower than the threshold value, the signal transmitted from the mobile station is received via the radio unit 101 and the radio unit 102. When the reception level of a signal transmitted from a mobile station is higher than the threshold value, the signal transmitted from the mobile station is received via one of the radio unit 101 and the radio unit 102.

(3) In order to keep the communication quality high, it is acceptable to have an arrangement wherein a threshold value for the reception level is set, and when the reception level of a signal transmitted from a mobile station is equal to or lower than the threshold value, the signal transmitted from the mobile station is received via the radio unit 101 and the radio unit 102. In such a case, the number of mobile stations with which the radio base station 100 is able to communicate may not necessarily be eight; however, it is possible to keep the quality of the communication with each mobile station high.

(4) The error checking processing performed by the control unit 107 is to check "if the signal has some errors" in the description above; however, the present invention includes an arrangement wherein the error checking processing is to check "the level of errors", and the control unit 107 outputs a switching instruction to the switching unit 108 so that a received signal having fewer errors is selected. More specifically, in a case where a signal transmitted by a mobile station is received via the radio unit 101 and the radio unit 102, after the two received signals are demodulated by the modem unit 105 and the modem unit 106 respectively, the control unit 107 obtains the demodulated received signals from the modem unit 105 and the modem unit 106. The control unit 107 counts and compares the number of errors (digital errors) included in each of the received signals. The control unit 107 outputs a switching instruction to the switching unit 108 so that one of the received signals having fewer errors is outputted to the base band unit 109.

(5) In the above embodiment, the radio base station 100 comprises two radio units; however, the present invention also includes a radio base station that comprises two or more radio units, as many signal processing units as the radio units, and as many modem units as the radio units, wherein time slots having the same timing at the two or more radio units are allocated to one mobile station, and a signal transmitted from the mobile station is received via the two or more radio units. After the two or more received signals are demodulated, the radio base station selects and outputs one of the received signals that has no error.

In addition, as described above, the present invention includes an arrangement wherein the control unit 107 obtains received signals that are demodulated by the two or more modem units respectively and counts and compares the number of errors included in each of the received signals. The control unit 107 outputs a switching instruction to the switching unit 108 so that one of the received signals that has the fewest errors is outputted to the base band unit 109.

The present invention also includes a radio base station that uses a PDMA (Path Division Multiple Access) method with an array antenna, in addition to the time-division multiplexing.

(6) In the embodiment described above, the radio base station 100 allocates, to one mobile station, two reception slots having the same timing, one in a TDMA/TDD frame at the radio unit 101 and the other in a TDMA/TDD frame at the radio unit 102; however, the two reception slots do not necessarily have the same timing. The present invention includes an arrangement wherein a radio base station allocates a reception slot at the radio unit 101 and a reception slot at a radio unit 102 that have mutually different timing to one mobile station. With this arrangement, it is possible to efficiently utilize time slots that are not used for communication.

(7) In the embodiment described above, four slots in a TDMA/TDD frame are all used as communication channels; however, in a normal TDMA/TDD frame, one of the slots is used as a control channel, the remaining three slots can be used as communication channels. Thus, needless to say, the present invention includes an arrangement wherein a TDMA/TDD frame is made up of a control channel and three communication channel.

(8) It is acceptable to consider that the present invention is methods as described above. Alternatively, it is acceptable to consider that the present invention is a computer program that realizes such methods with the use of a computer, or digital signals converted from the computer program.

Additionally, it is acceptable to consider that the present invention is a computer-readable recoding medium e.g. a floppy disk, a hard disk, a CD-ROM, an MO, a DVD-ROM, a DVD-RAM or a semiconductor memory, that records such a computer program or such digital signals thereon; or to consider that the present invention is realized through transmission of such a computer program or such digital signals recorded on such a recording medium via telecommunication lines, wireless or cable transmission network, a network such as the Internet, or the like.

Further, it is acceptable to consider that the present invention is a computer system comprising a microprocessor and a memory, wherein the memory stores therein the computer program, and the microprocessor operates according to the computer program.

Furthermore, it is acceptable to execute the aforementioned program or digital signals on a dependent computer system by delivering the program or digital signals recorded on the aforementioned recording medium or via the aforementioned network or the like.

(9) It is acceptable to combine the embodiment and one or more of the modification examples described above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A radio base station that communications with one or more mobile stations using a time division multiplexing, comprising:
   a first radio unit communicating by radio with the one or more mobile stations using a plurality of slots that constitute a first communication frame;
   a second radio unit communicating by radio with the one or more mobile stations using a plurality of slots that constitute a second communication frame;
   a table storage unit storing therein, for each mobile station that has established a communication channel, (i) a reception level of a signal received from the mobile station, and (ii) information of each slot used for communication with the mobile station, the reception level being stored associated with the information; and
   a controlling unit, in response to a channel establishment request issued from a new mobile station,
     (i) when the first and second frames each have one or more empty slots, allocate one of the empty slots of each of the frames to the new mobile station; and
     (ii) when neither of the first nor second frames has an empty slot, (a) select two mobile stations with highest reception levels from the table storage unit, (b) perform slot switching processing on the two mobile stations, and thus (c) allocate one or two slots to the new mobile station.

2. The radio base station of claim 1, wherein the controlling unit writes, into the table storage unit, a reception level of a signal of the new mobile station, and
   when neither of the first and second frames has an empty slot, and the controlling unit selects, from the table storage unit, two mobile stations that have highest reception levels, which results that the new mobile station is selected as one of the two selected mobile stations, the controlling unit performs the slot switching processing by:
     deallocating one of two slots that have been allocated to another of the two selected mobile stations that has established a communication channel; and
     allocating the deallocated slot to the new mobile station.

3. The radio base station of claim 2, wherein
   the controlling unit has a threshold of a reception level,
   when the slot switching processing is performed, the controlling unit obtains, from the table storage unit, a reception level of a signal of a mobile station currently in communication by using each slot of the first and second communication frames, and
   when the obtained reception level is equal to or smaller than the threshold, the controlling unit performs control so that the signal transmitted from the mobile station in communication is received via both the first and second radio units.

4. The radio base station of claim 3, wherein
   the controlling unit judges levels of errors in two signals received via the first and second radio units, and performs control so that a signal is transmitted to the mobile station via one of the radio units that receives one of the two received signal judged to have fewer errors.

5. The radio base station of claim 1, wherein
   the controlling unit writes, into the table storage unit, a reception level of a signal of the new mobile station, and
   when neither of the first and second frame has an empty slot, and the controlling unit selects, from the table storage unit, two mobile stations that have highest reception levels, which results that two mobile stations that have established communication channels are selected as the two selected mobile stations, the controlling unit performs the slot switching processing by:
deallocating one of two slots that have been allocated to one of the two mobile stations;
allocating the deallocated slot to another of the two mobile stations; and
allocating two slots that have been allocated to the other mobile station to the new mobile station.

6. The radio base station of claim 5, wherein
the controlling unit has a threshold of a reception level, when the slot switching processing is performed, the controlling unit obtains, from the table storage unit, a reception level of a signal of a mobile station currently in communication by using each slot of the first and second communication frames, and
when the obtained reception level is equal to or smaller than the threshold, the controlling unit performs control so that a signal transmitted from the mobile station in communication is received via both the first and second radio units.

7. The radio base station of claim 6, wherein
the controlling unit judges levels of errors in two signals received via the fist and second radio units, and performs control so that a signal is transmitted to the mobile station via one of the radio units that receives one of the two received signal judged to have fewer errors.

8. The radio base station of claim 1 wherein the first communication frame and the second communication frame each includes a control channel.

9. A controlling method used by a radio base station that communicates with one or more of mobile stations and that includes:
a first radio unit communicating by radio with the one or more mobile stations using a plurality of slots that constitute a first communication frame;
a second radio unit communicating by radio with the one or more mobile stations using a plurality of slots that constitute a second communication frame; and
a table storage unit storing therein, for each mobile station that has established a communication channel, (i) a reception level of a signal received from the mobile station, and (ii) information of each slot used for communication with the mobile station, the reception level being stored associated with the information, the controlling method comprising the following steps performed in response to a channel establishment request issued from a new mobile station:
(i) when the first and second frames each have one or more empty slots, allocating one of the empty slots of each of the frames to the new mobile station, and
(ii) when neither of the first nor second frames has an empty slot, (a) selecting two mobile stations with highest reception levels from the table storage unit, (b) performing slot switching processing on the two mobile stations, and thus (c) allocating one or two slots to the new mobile station.

10. A computer readable recording medium having a controlling program recorded therein that is executed by a radio base station that communicates with one or more of mobile stations that includes:
a first radio unit communicating by radio with the one or more mobile stations using a plurality of slots that constitute a first communication frame;
a second radio unit communicating by radio with the one or more mobile stations using a plurality of slots that constitute a second communication frame; and
a table storage unit storing therein, for each mobile station that has established a communication channel, (i) a reception level of a signal received from the mobile station, and (ii) information of each slot used for communication with the mobile station, the reception level being stored associated with the information,
the controlling program comprising code causing the radio base station to perform the following steps in response to a channel establishment request issued from a new mobile station:
(i) when the first and second frames each have one or more empty slots, allocating one of the empty slots of each of the frames to the new mobile station; and
(ii) when neither of the first nor second frames has an empty slot, (a) selecting two mobile stations with highest reception levels from the table storage unit, (b) performing slot switching processing on the two mobile stations, and thus(c) allocating one or two slots to the new mobile station.

* * * * *